April 25, 1967 H. W. RIMBACH 3,316,109
COATING COMPOSITION
Filed March 11, 1963 2 Sheets-Sheet 1

INVENTOR.
HENRY W. RIMBACH.
BY
W. D. Palmer
ATTORNEY.

April 25, 1967

H. W. RIMBACH 3,316,109

COATING COMPOSITION

Filed March 11, 1963

INVENTOR.
HENRY W. RIMBACH.
BY
W. D. Palmer
ATTORNEY.

3,316,109
COATING COMPOSITION
Henry W. Rimbach, Cedar Grove, N.J., assignor to Westinghouse Electric Corporation, Pittsburgh, Pa., a corporation of Pennsylvania
Filed Mar. 11, 1963, Ser. No. 264,248
2 Claims. (Cl. 106—65)

This invention generally relates to lamps and, more particularly, to a coating composition for phosphor coating a substrate such as a lamp envelope, a method for adhering phosphor to a substrate such as a lamp envelope, and to a phosphor-coated substrate.

Fluorescent lamps and some high-pressure, mercury-vapor (HPMV) lamps are provided with a phosphor coating which is adhered to the interior surface of the lamp envelope. Such phosphor coatings are normally applied by suspending the phosphor powder in a liquid vehicle which contains a small amount of organic binder material, such as ethyl cellulose or nitrocellulose, in order to impart the desired viscosity to the coating composition. This coating composition is flowed over the interior envelope surface, the vehicle volatized, and the binder thereafter broken down and removed by heating the coated envelope to a temperature of approximately 650° for about three minutes. This last heating or lehring also serves to adhere the phosphor to the lamp envelope.

In the case of fluorescent lamps, the phosphor is normally coated onto the inner envelope surface so that the phosphor is exposed directly to the discharge plasma. In the case of HPMV lamps, such as described in U.S. Patent No. 2,748,303, the phosphor is normally coated onto the inner surface of an envelope which surrounds the arc tube, and the phosphor is excited to fluorescence by the generated ultraviolet radiations which pass the arc tube.

Some phosphors are known to be sensitive to the lehring temperatures required to volatilize the organic binder. This decreases the fluorescent brightness of the phosphor. Phosphors which are particularly sensitive to such lehring are those which are activated by stannous tin or cuprous copper or mixtures thereof, and an example of such a phosphor is strontium-magnesium orthophosphate activated by stannous tin. Manganese-activated magnesium fluorogermanate is often used with HPMV lamps, and is not known to be sensitive to lehring temperatures. However, the output of an HPMV lamp incorporating this phosphor is normally about 2½ to 3% lower than that of a clear or uncoated lamp, with only the color of the lamp and the color rendition of objects illuminated thereby being substantially improved.

It is the general object of the invention to provide a coating composition for adhering phosphor powder to a surface, which coating composition enables the phosphor to be coated without the use of the usual high lehring temperatures.

It is another object to provide a method for adhering phosphor powder to a surface whereby high lehring temperatures are avoided.

It is a further object to provide a phosphor-coated substrate in which the phosphor is adhered to the substrate by means of a selected inorganic binder, which binder causes the performance of the phosphor to be improved.

The aforesaid objects of the invention, and other objects which will become apparent as the description proceeds, are achieved by forming on the substrate which is to be coated, a film of selected liquid vehicle having inorganic binder material suspended therein. A portion of the liquid vehicle is volatilized from the applied film to leave a viscous, non-flowing residue of binder and vehicle. Against this still-wet film is impinged a phosphor powder. The residual portion of the liquid vehicle wets the phosphor powder and causes it to adhere to the surface being coated. Thereafter, the remaining liquid vehicle is violatilized from the film. There is also provided a coating composition for adhering phosphor to a surface, which coating composition comprises a mixture of liquids having varying vapor pressures, with the finely divided inorganic binder material suspended therein. There is additionally provided a phosphor-coated substrate, wherein a particular binder material is used in order to cause the coated phosphor to have improved performance characteristics.

For a better understanding of the invention, reference should be had to the accompanying drawings, wherein.

Figure 1:
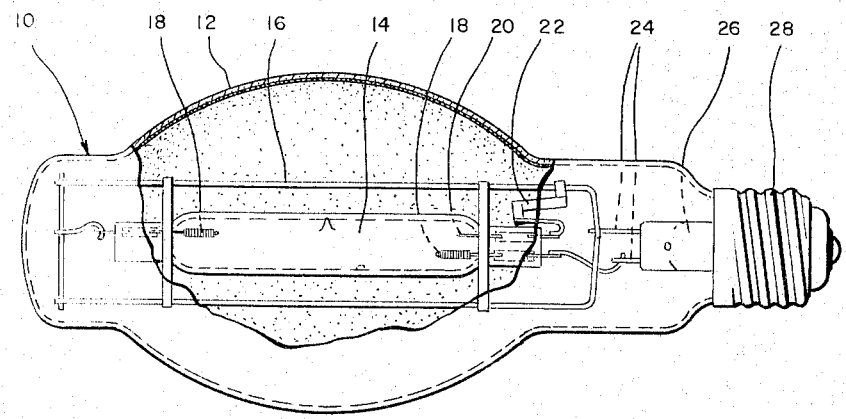
FIGURE 1 is an elevational view, partly in section, illustrating an HPMV lamp wherein the inner surface of the outer envelope carries a coating of phosphor material applied in accordance with the present invention.

With specific reference to the form of the invention illustrated in the drawings, in FIG. 1 is shown an HPMV lamp 10 which has an exterior envelope 12 coated with phosphor in accordance with the present invention. The lamp 10 generally corresponds to the lamp as described in the aforenoted Patent 2,748,303, which patent may be referred to for details. Briefly, the exterior envelope 12 surrounds a quartz arc tube 14 which is coaxially disposed therein. The arc tube 14 is held by a suitable supporting frame 16 which also serves as one electrical connection. Operating electrodes 18 are disposed in the opposite ends of the arc tube 14. A starting electrode 20 is disposed at one end of the arc tube 14, and is electrically connected to the supporting frame 16 through a suitable starting resistor 22. The lead-in conductors 24 are sealed through the neck of the outer envelope 12 by means of a conventional re-entrant stem 26 and electrical connection is facilitated by a conventional screw-type base 28.

The coating composition which is used to adhere the phosphor to the interior envelope surface comprises a liquid vehicle which has a predetermined amount of selected, inorganic binder material suspended therein. The liquid vehicle of the coating composition comprises a mixture of a first liquid having a relatively high vapor pressure at normal room temperature and other liquid which has a relatively low vapor pressure at normal room temperature. These liquids are mixed in miscible proportions and are capable of wetting the surface to be coated. The binder material, which is suspended in finely divided form throughout the liquid vehicle, is chosen so that when substantially dry and positioned in contacting relationship between the phosphor and the surface to be coated, it will bind the phosphor to the surface. To avoid discoloration, the liquid vehicle and binder are so chosen as to be substantially chemically inert with respect to one another, although a small proportion of the total binder material may be dissolved in the liquid vehicle.

The relative proportions of the low-vapor-pressure liquid and the binder suspended therein are such that when these two ingredients are mixed together, without the presence of the liquid which has a relatively high vapor pressure, the mixture has sufficient viscosity to substantially prevent free flow when coated as a thin film on the surface which is to be phosphor coated. The viscosity of the low-vapor-pressure liquid and suspended binder is too great, however, to permit such a mixture to be coated as a substantially uniform thin film over the surface which is to be phosphor coated. To permit easy application of the coating composition, it is necessary to include as a part of the coating composition a predetermined proportion of the liquid which has a relatively high vapor pressure. This composite coating composition has a sufficiently low viscosity to permit same to be coated and flow over the surface as an adherent thin film.

Figure 2:
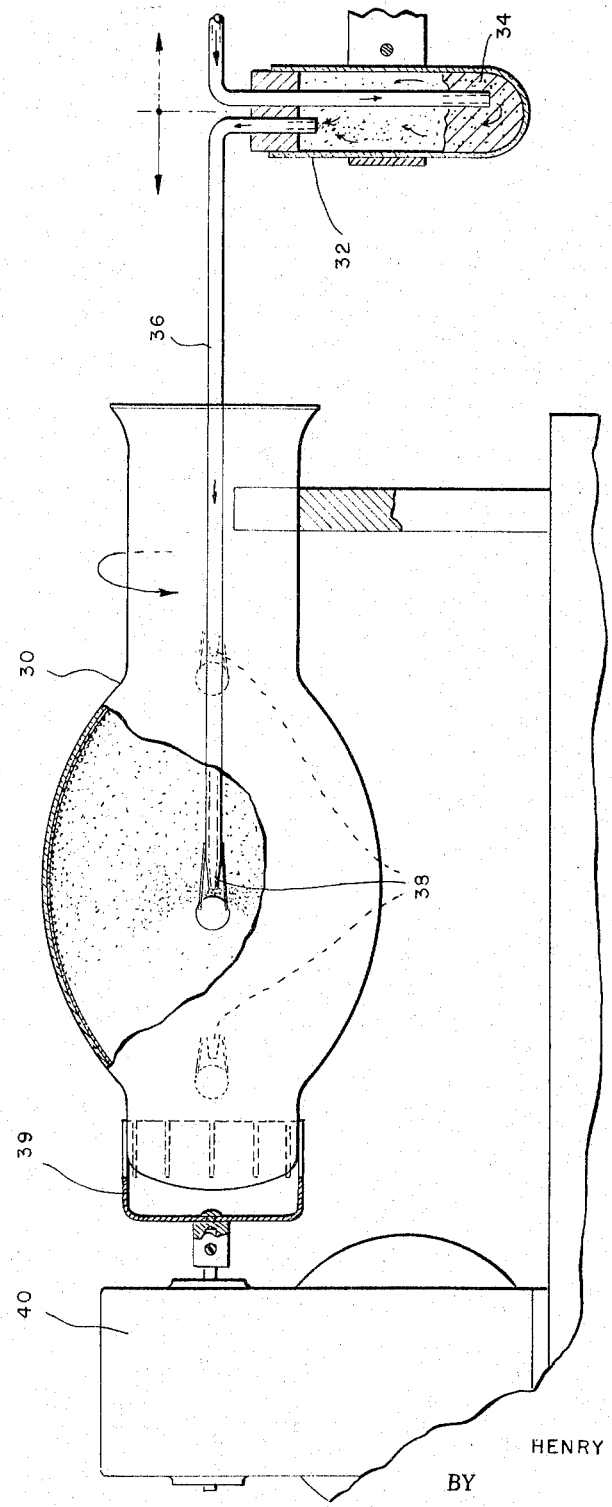
FIG. 2 is an elevational view, partly in section, illustrating the phosphor coating step wherein a smoke of phosphor powder is being impinged against a bulb which has previously been coated with the coating composition of the present invention.

The coating composition may be applied to the surface to be phosphor coated in any conventional manner, such as flowing or spraying, although it has been found advantageous merely to flow the coating composition over the surface to be coated, such as an open-necked bulb 30, as shown in FIG. 2. Immediately after a film of the coating composition has been applied to the interior surface of the bulb 30, the high-vapor-pressure liquid vehicle portion thereof volatilizes, leaving as a residue an adherent, nonflowing, thin film of the low-vapor-pressure liquid which has the finely divided inorganic binder material suspended therein.

Figure 3:
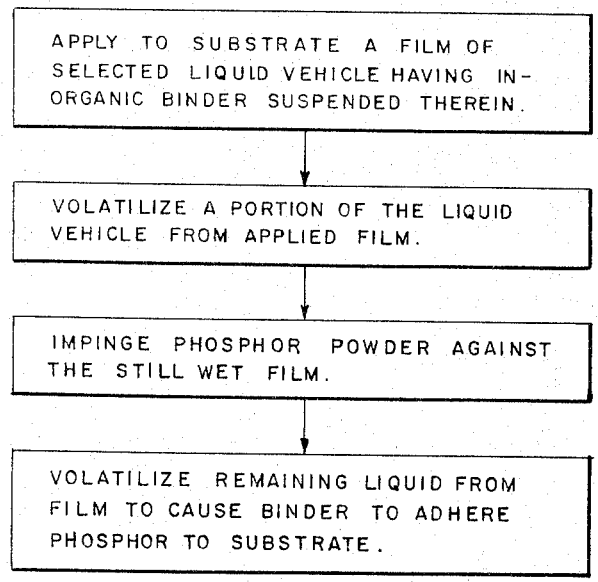
FIG. 3 is a flow chart which sets forth the steps of the present method.

After at least a substantial proportion of the high-vapor-pressure (low boiling) liquid constituent of the coating composition has been volatilized, a smoke of phosphor powder is impinged against this still-wet but very viscous residual film which adheres to the envelope surface. Preferably a phosphor smoke is created by forcing compressed air through a reservoir 32, which contains a supply 34 of the phosphor to be coated. The phosphor is carried as a smoke from the reservoir 32, through an elongated conduit 36, and is impinged against a target 38, which causes the phosphor to disperse as a smoke cloud. During this coating operation, the bulb 30 is retained at its dome portion by a conventional friction clamp 39, which is adapted to be rotated during phosphor coating by a conventional motor-gear arrangement 40. In the coating operation as shown, the elongated feed conduit 36 is gradually introduced into the rotating bulb 30, in order to uniformly coat the desired amount of phosphor onto the still-wet interior surface of the bulb 30. After the phosphor is completely coated, the residual low-vapor-pressure liquid which remains on the interior surface of the bulb is volatilized, either by heating or allowing the bulb to stand for a relatively prolonged period. This causes the inorganic binder material to contact both the phosphor and interior bulb surface, which in turn adheres the phosphor to the bulb 30. The essential steps of the method for applying the phosphor are shown in the flow diagram of FIG. 3.

As a specific example, the liquid vehicle component of the present coating composition which has a relatively low vapor pressure (and a high boiling point) is ethylene glycol monobutyl ether acetate, and the component of the liquid vehicle which has a relatively high vapor pressure is methanol. In the case of this acetate-methanol liquid vehicle, the methanol desirably comprises from 80% to 70% by weight of the total liquid in the coating composition, and the acetate comprises from 20% to 30% by weight of the total liquid in the coating composition. Other suitable high-boiling organic liquids which have a relatively low-vapor-pressure can be substituted for the foregoing preferred example, such as diethylene glycol monoethylether acetate. Other low-boiling liquids which have a relatively high vapor pressure can be substituted for the preferred methanol, and an example is ethanol.

It has been found that the vapor pressure of the high-boiling component of the liquid vehicle desirably is from 0.005 mm. to 2 mm. Hg at normal room temperature, with the preferred vapor pressure for this component being from 0.01 mm. to 0.5 mm. Hg at normal room temperature. The vapor pressure for the low-boiling component of the liquid vehicle desirable is from 200 mm. to 17 mm. Hg at normal room temperature, with the preferred vapor pressure for this component being from 200 mm. to 30 mm. Hg at normal room temperature. As a specific example, the methanol and ethylene glycol monobutylether acetate are present in the liquid vehicle component of the composition in the ratio by weight of 76%–24%.

The preferred finely divided, inorganic binder material is alumina, such as is available under the trademark "ALON C." In order to obtain best results with respect to improved phosphor performance, however, it is desirable to use an inorganic binder which comprises a mixture of the indicated alumina as well as boric oxide. Of course when the composition is initially applied, the boric oxide in all probability is present in large part as boric acid, but when the lamp is baked during final exhaust, substantially all water present in the boric oxide and alumina is removed. Since the degree of hydrolysis of the boric oxide in the coating composition can vary, the weight percentages of this coating composition component are expressed in terms of the oxide, rather than the acid. Desirably the total binder in the coating composition is present in amount of from 1.5 grams to 23.5 grams per 100 cc. of total liquid in the coating composition, with the alumina present in an amount of from 1.5 grams to 15 grams per 100 cc. and the boric oxide present in amount of up to 8.5 grams per 100 cc. The preferred range for binder materials is from 6.5 grams to 10.5 grams alumina and from 2.5 grams to 5 grams of boric oxide per 100 cc. of total liquid. As a specific example, a binder combination of about 8.5 grams of alumina and about 3.4 grams of boric oxide per 100 cc. of total liquid has been found to give very good results.

As a detailed specific example, 50 cc. of methanol are mixed with 16 cc. of ethylene glycol monobutyl ether acetate, along with 5.6 grams of the finely divided alumina and 2.2 grams of boric oxide. This coating composition is flowed over the envelope surface to leave a uniform film approximately 46 microns thick. The methanol volatilizes almost immediately, leaving a substantially uniform film having a thickness of about 11 microns. The amount of finely divided binder material is such that the binder and liquid acetate form a very viscous "slush" which will not flow readily under the forces of gravity.

Thereafter the phosphor smoke is impinged against the still-wet coating "slush." Because of the viscosity of the remaining coating and the relatively large size of the phosphor particles, a substantial portion of the phosphor is only partially immersed into the remaining coating composition. The amount of the phosphor which is utilized is not particularly critical, but desirably is from 1 to 20 milligrams of phosphor per square centimeter of surface area being coated, and preferably is from 2 to 10 milligrams of phosphor per square centimeter of surface area being coated. The remaining liquid vehicle portion of the formed film of the coating composition is then volatilized, preferably by heating the phosphor-coated bulb to a temperature of about 300° C. for a period of about 20 minutes. Thereafter the lamp fabrication is completed in accordance with the conventional procedures. The coarser phosphor particles have shown better performance characteristics, particularly in the case of either copper-activated phosphors, such as disclosed in U.S. Patent No. 3,025,423, or tin-activated strontium-magnesium orthophosphate.

The coated substrate or envelope thus has the finely divided phosphor adhered thereto by the inorganic binder. The binder comprises a mixture of aluminum oxide and boric oxide. The aluminum oxide is present in amount of from 0.07 to 0.7 mg./cm.$^2$ of surface area of the coated substrate, and the boric oxide is present in amount of from 0.03 to 0.42 mg./cm.$^2$ of surface area of coated substrate. Preferably the alumina is present in amount of from 0.25 to 0.5 gm./cm.$^2$ of surface area of coated substrate and a specific example is about 0.4 gm./cm.$^2$. Preferably the boric oxide is present in amount of from 0.03 to 0.23 mg./cm.$^2$ of surface area of coated substrate, and as an example, the boric oxide is present in amount of from 0.05 to 0.11 mg./cm.$^2$.

In tests on a large number of lamps coated in accordance with the present method, the initial light output, as well as the maintenance of light emission for HPMV lamps utilizing cuprous-copper-activated or stannous-tin-activated phosphors is greatly improved. In the case of a strontium-magnesium phosphate activated by stannous tin, the initial light output is greater than the control lamps by about 2000 lumens. After 2500 hours operation, 400 watt HPMV lamps utilizing the strontium-magnesium phosphate phosphor, coated in accordance with the present invention, display an output which is about 2000 lumens greater than that of the control lamps. Some but not all of this improvement can be attributed to the fact that this particular phosphor is sensitive to usual lehring temperatures as required to volatilize organic binder, which lehring is not used when coating in accordance with the present method.

A most unexpected improvement has been found in the case of the fluorogermanate phosphor, which phosphor has been considered as relatively insensitive to high lehring temperatures. 400 watt HPMV lamps coated as per the present invention with magnesium fluorogermanate phosphor display an initial (100 hour) output approximately 1150 lumens greater than otherwise similar factory control lamps which were phosphor coated using organic binder and then lehred. After 500 hours operation, these same lamps displayed an output which averaged 1500 lumens greater than the phosphor-coated factory control lamps. The mechanism by which this improved performance is obtained is not understood, since it has always been assumed that the total output of a fluorogermanate-coated HPMV lamp could not be substantially improved over that of a clear lamp. Whatever the explanation, the foregoing improved results have been consistently achieved.

While the foregoing description considers in detail a phosphor-coated HPMV lamp, it should be understood that the present coating procedures can also be used to coat fluorescent tubes with phosphor, such as the well-known halophosphates. One advantage of such a coating procedure is the elimination of the very high lehring temperatures required to burn out the organic binder, thereby minimizing impurities which may be driven from the glass, and also eliminating the possibility that all of the organic binder material is not volatilized during lehring.

It will be recognized that the objects of the invention have been achieved by providing an improved method for adhering phosphor powder to a substrate, a coating composition which enables a phosphor material to be adhered to a substrate without lehring at high temperatures, and an improved phosphor coating, wherein the coated phosphor has improved performance characteristics.

While best examples of the invention have been illustrated and described in detail, it is to be particularly understood that the invention is not limited thereto or thereby.

I claim as my invention:

1. A composition for adhering phosphor powder to a surface, said composition consisting essentially of:
   (a) a liquid vehicle consisting essentially of from 80% to 70% by weight of methanol or ethanol and from 20% to 30% by weight of ethylene glycol monobutyl ether acetate or diethyl glycol monoethyl ether acetate; and
   (b) inorganic binder material at least a substantial proportion of which is suspended in finely divided form throughout said liquid vehicle, said binder material consisting essentially of alumina or alumina plus boric oxide, said alumina present in amount of from 1.5 grams to 15 grams per 100 cc. of total liquid in said composition, and said boric oxide present in amount up to 8.5 grams per 100 cc. of total liquid in said composition.

2. The composition as specified in claim 1, wherein said inorganic binder material is alumina plus boric oxide, said alumina is present in amount of from 6.5 to 10.5 grams per 100 cc. of total liquid in said composition, and said boric oxide is present in amount of from 2.5 to 5 grams per 100 cc. of total liquid in said composition.

References Cited by the Examiner

UNITED STATES PATENTS 2,905,572   9/1959   Jones _____ 252—301.3

TOBIAS E. LEVOW, *Primary Examiner.*

J. E. POER, *Assistant Examiner.*